United States Patent
Erikson et al.

[11] Patent Number: 6,131,478
[45] Date of Patent: Oct. 17, 2000

[54] ANTI-BACKLASH NUT ASSEMBLY

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 09/226,470

[22] Filed: Jan. 7, 1999

[51] Int. Cl.[7] .............................. F16H 57/12; F16H 25/24
[52] U.S. Cl. ...................... 74/441; 74/424.8 A; 74/459; 74/531
[58] Field of Search .......................... 74/424.8 A, 441, 74/459, 531

[56] References Cited

U.S. PATENT DOCUMENTS

| | | | |
|---|---|---|---|
| Re. 31,713 | 10/1984 | Erikson et al. | 74/441 |
| 4,131,031 | 12/1978 | Erikson et al. | 74/441 |
| 4,353,264 | 10/1982 | Erikson et al. | 74/441 |
| 4,479,397 | 10/1984 | Jelinek et al. | 74/89.15 |
| 4,566,345 | 1/1986 | Erikson et al. | 74/89.15 |
| 4,833,938 | 5/1989 | Reinwall et al. | 74/531 X |
| 5,079,963 | 1/1992 | Yamamoto et al. | 74/89.15 |
| 5,689,997 | 11/1997 | Schaller | 74/335 |
| 5,732,596 | 3/1998 | Erikson et al. | 74/441 |
| 5,839,321 | 11/1998 | Siemons | 74/441 |

FOREIGN PATENT DOCUMENTS

| | | |
|---|---|---|
| 0 529 563 B1 | 8/1992 | European Pat. Off. . |
| 0 559 441 A1 | 3/1993 | European Pat. Off. . |
| 0 577 390 A2 | 6/1993 | European Pat. Off. . |

*Primary Examiner*—Allan D. Herrmann
*Attorney, Agent, or Firm*—Hamilton, Brook, Smith & Reynolds, PC

[57] ABSTRACT

An anti-backlash nut, movable along a rotatable screw. The nut has internal threads complementary to the threads in the screw. The nut has two nut halves movable as a unit and also rotatable relative to each other on the screw, and are connected to the nut halves to induce their relative rotation on the screw in opposite directions. There is an elastomeric friction mechanism, such as a washer, between the two halves to limit their relative rotational movement. The elastomeric friction mechanism is enclosed between the nut halves to have uniform compression.

15 Claims, 4 Drawing Sheets

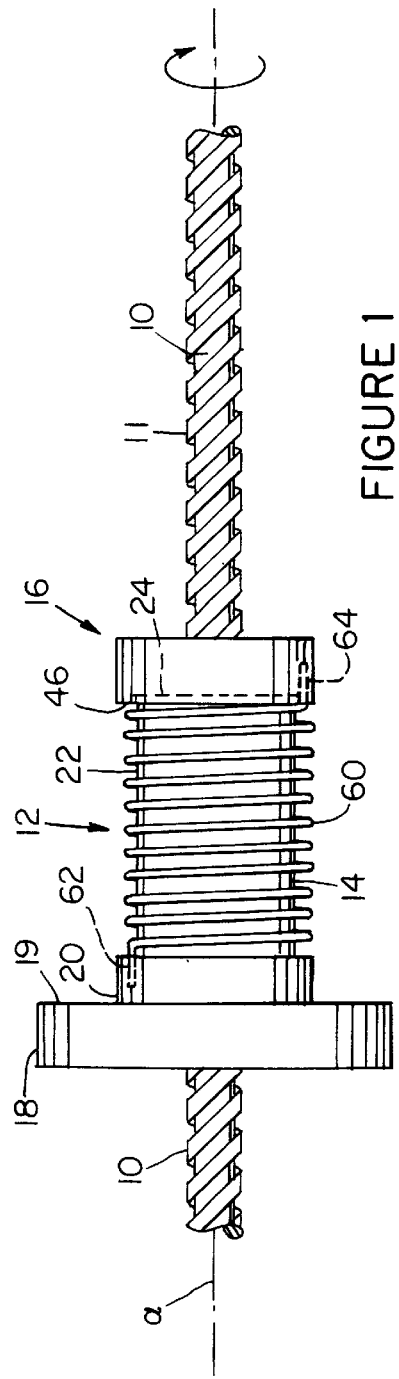
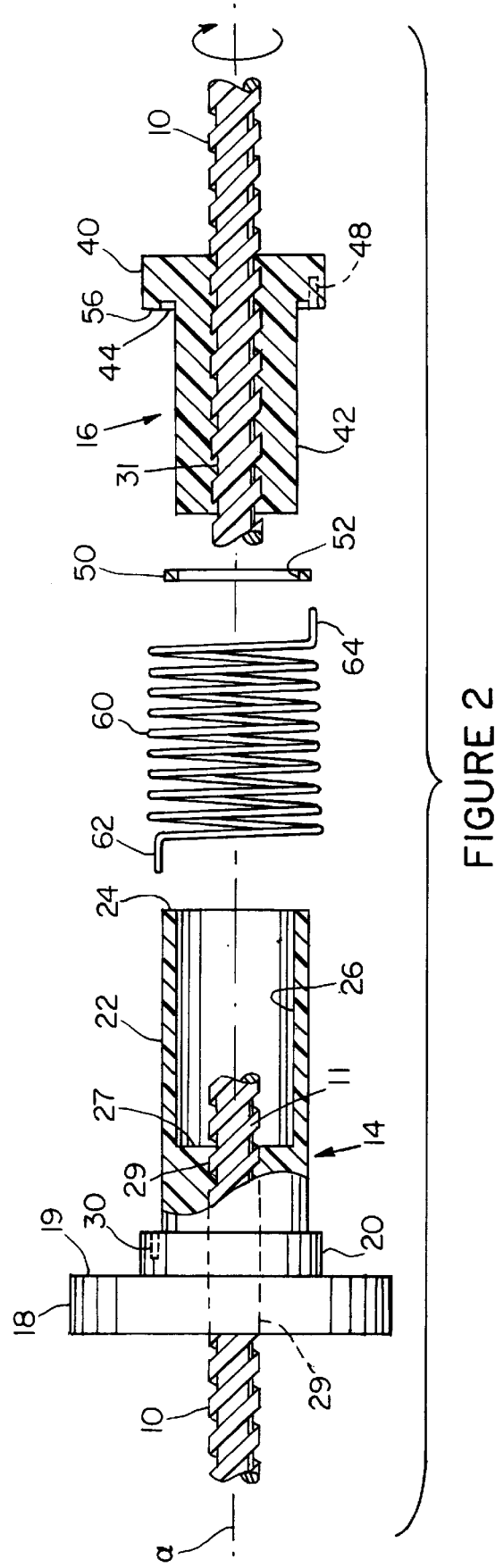

ANTI-BACKLASH NUT ASSEMBLY

BACKGROUND OF THE INVENTION

Many modern day machines, from data printers to positioning devices to robots and the like, require an element to reciprocate at relatively high speeds and with considerable accuracy. Today's standards require such equipment to have good positional repeatability, reliability and long life. A typical element for accomplishing this is an anti-backlash nut threaded onto a lead screw that traverses back and forth when the screw rotates.

One such element is disclosed in our U.S. Pat. No. 4,131,031 which includes an anti-backlash nut assembly which undergoes translational movement back and forth along a lead screw in response to the rotation of the screw. The nut itself is divided into two halves, both of which have internal threads complementary to the thread on the screw. The two portions or halves of the nut are retained on the screw, being secured in a radial direction, by a spacer in the form of a tube or collar. A spring is used to apply an axial biasing force in the longitudinal direction of the screw, forcing the nut halves apart, to minimize or eliminate backlash.

While anti-backlash nuts made in accordance with our above-identified patent have proven satisfactory, they are somewhat limited because of the spring employed. The spring biases the nut halves apart to urge their thread flanges against opposite thread flanks of the lead screw. If a load were imparted to one of the nut halves without the spring in place, the opposite nut half would translate with respect to the first nut half because there is nothing to restrain it. The anti-backlash feature of the invention depends upon the axial force of the spring itself. Since the load is transferred through the spring, a spring of high compressibility or stiffness causes too great a frictional force and thus, a loss of efficiency. Conversely, too weak a spring would not adequately reduce backlash. Thus, the anti-backlash aspect is only as good as the force of the spring.

Another element is to be found in our U.S. Pat. No. 4,353,264 in which we have disclosed an anti-backlash nut assembly which also undergoes translational movement longitudinally along a screw in response to rotational movement of the screw. The mechanism employs a nut which is split into two nut halves which are internally threaded with the same thread and hand as the screw. The two nut halves are retained in the radial direction by a coaxial cylinder surrounding portions of the nut halves. In addition, a spacer is mounted on the retainer means between the nut surfaces and is biased against at least one of the surfaces to close any gap which may occur between the thread of the screw and the thread of the nut. Thus, the biasing is accomplished by employing a number of mechanical elements.

Whenever a number of elements are used for establishing this biasing, they are inherently weak in terms of axial stiffness due to mechanical and manufacturing fit problems. The ideal anti-backlash nut would have unlimited axial stiffness such that when a load is applied in either direction, no discernible movement would occur due to the elasticity of the nut itself. The anti-backlash aspect of the nut is only as good as the stiffness of the nut which has been created. Our U.S. Pat. No. 5,732,596 was directed to this problem and solved the problem by a high friction elastomeric means, such as a washer, provided between faces formed on each nut half normal to the screw to create high frictional contact between the high friction elastomeric means and the faces to limit relative rotational movement between the nut halves when they are in the closed abutting position and to permit the nut halves to translate along the rotational screw.

In solving this problem, another problem was created related to the compression of the elastomeric means, i.e. the washer. The washer does not behave in a uniform manner in certain instances of compression. The washer in compression follows a certain yield curve and then jumps to a second yield curve. The jump from one curve to the other leads to inconsistent results. It is the intent of this invention to solve such a problem.

SUMMARY OF THE INVENTION

The invention resides in an anti-backlash nut which is designed to undergo bidirectional translation, i.e. back and forth along a rotatable lead screw. The nut has internal threads which are complementary to the thread on the screw. The nut itself comprises two nut halves which are movable as a unit along the rotatable lead screw and are also rotatable relative to each other on the screw.

The nut halves are joined by an element, a spring in a preferred embodiment, to induce their relative rotation on the screw, in opposite directions, toward a closed or locked position, wherein the backlash between the threads of the screw and the threads of each of the nut halves is taken up. A torsion spring has been used satisfactorily to induce rotation.

In addition, there are means between the nut halves to limit their relative rotational movement when they are in the closed or locked position to prevent the backlash from recurring. A high friction elastomeric washer has been employed between the nut halves for this purpose.

The washer, located between the two halves of the anti-backlash nut, is contained radially to limit radial expansion. In a preferred embodiment, the washer positioned radially inwardly of a shoulder on one of the nuts prevents radial expansion of the washer. The limiting of radial expansion of the washer controls the compression of the washer ensuring more uniform control.

The encased elastomeric material results in a uniform force to be exerted on a surface. The encased material acts in a manner similar to a hydraulic system.

In one preferred embodiment, each nut half has a hemi-cylindrical portion having internal threads complementary to the external threads of the rotatable lead screw. The hemi-cylindrical portions are received in a retainer sleeve. In this preferred embodiment, the retainer sleeve is formed integrally as one part with one of the nut halves. The integrity of the retainer sleeve with the nut half results in increased axial stiffness and decreased manufacturing fit problems.

In one feature of the invention, one of the nut halves includes a face plate for attaching the nut to a load. In another feature of the invention, one of the nut halves telescopes rotatably within the other.

The above and other features of the invention including various and novel details of construction and combination of parts will now be more particularly described with reference to the accompanying drawings and pointed out in the claims. It will be understood that the particular anti-backlash nut assembly embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

FIG. 1 is a side elevation of an anti-backlash nut assembly on a lead screw illustrating the invention;

FIG. 2 is the anti-backlash nut of FIG. 1 shown in an exploded view and partly in section;

DETAILED DESCRIPTION OF THE INVENTION

Figure 3:
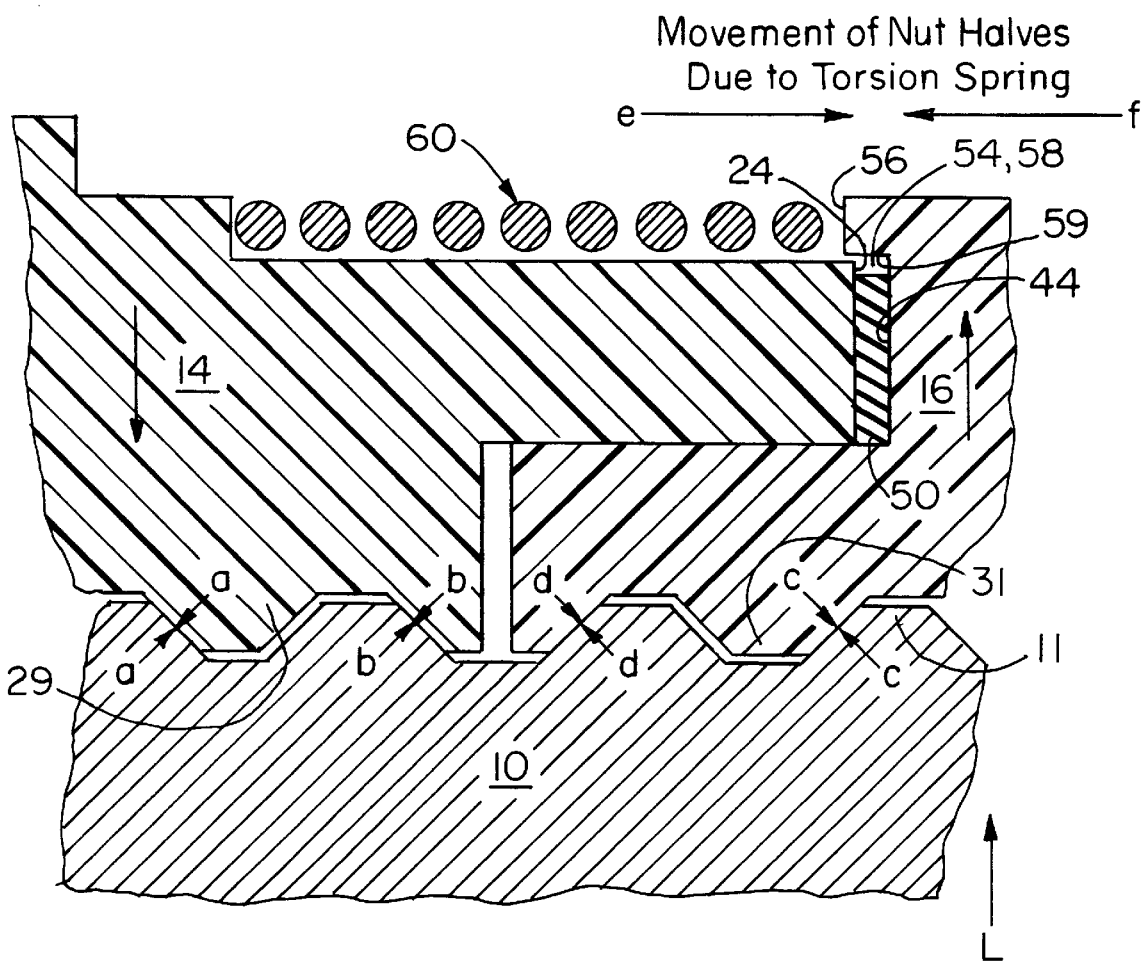
FIG. 3 is a sectional detailed view on an enlarged scale of two anti-backlash nut halves and the lead screw of FIG. 1.

Referring to FIGS. 1 and 2, an anti-backlash nut embodying the invention will be described. A right hand threaded lead screw 10 is shown mounting an anti-backlash nut assembly generally designated 12. The lead screw 10 has threads 11. The nut comprises a first or left hand nut portion 14 and a second or right hand nut portion 16 which are driven in bidirectional translation, back and forth along the screw 10 by the rotation of the screw. The nut portions 14 and 16 are also called nut halves. The left hand nut half 14 has a face plate 18 for joining the nut to a load to be reciprocated back and forth by the lead screw. A circular portion 20 projects from the right hand surface of the face plate 18. A second cylindrical member 22, as best seen in FIG. 2, projects from the circular member 20 and terminates in a circular or ring-shaped flat face 24 which is formed at right angles to the axis α of the lead screw 10. A circular bore 26 is formed in the face 24 of the cylindrical member 22 and terminates at a wall 27 as seen in FIG. 2.

The center of the face plate 18, the cylindrical member 20 and a portion of the cylindrical member 22 are formed with internal screw threads 29 along the axis α. The internal screw threads 29 are the same size and hand as the threads on the lead screw 10. A small bore 30 is formed in the circular portion 20.

The right nut half 16 includes a cylindrical portion 40 and a second smaller cylindrical portion 42. The interior of the nut half 16 is also provided with internal screw threads 31 of the same size and hand as the threads of the lead screw 10. The cylindrical portion 40 has a flat face 44 formed normal to the axis α of the lead screw and the threads 31 of the nut half 16. Face 44 and face 24 are parallel and positioned the same radial distance from the centerline defined by the axis α.

The cylindrical portion 40 has a second flat face 56 which forms an annular ring around a bore 58, as best seen in FIG. 3. The flat face 44 forms the end wall of the bore 58. A cylindrical shoulder 59 extends between the flat faces 44 and 56, as best seen in FIG. 3. A second small bore 48 is formed in the cylindrical portion 40 of the second nut half 16 as best seen in FIG. 2.

Anti-friction means in the form of a high friction, elastomeric washer 50 is provided. It has a circular bore 52 just slightly larger than the diameter of the cylindrical portion 42 of the nut half 16 such that the elastomeric washer 50 may be slid over the cylindrical portion 42 and abut the face 44 when the nut halves are assembled. The washer 50 abuts the flat face or circular ring 24 of the nut half 14 when assembled as seen in FIG. 3. The outer diameter of the washer is slightly smaller than the cylindrical shoulder 59.

A torsion spring 60 having tangs 62 and 64 is provided to induce relative rotation (in opposite directions) of the nut halves on the screw when they are assembled as shown in FIG. 1.

Each of the nut halves 14, 16 are threaded onto the lead screw 10 as shown in FIG. 1 with the cylindrical portion 42 of the right nut half 16 telescoping into the cylindrical opening 26 in the left nut half 14. The torsion spring 60 is given a twist to tighten it slightly. The tang 62 is inserted into the bore 30 and the tang 64 is inserted into the bore 48.

In the assembled position shown in FIG. 3, the elastomeric washer 50 is located between the face 24 on the nut half 14 and the face 44 on the nut half 16 which parts are in closed abutting position against the washer 50 due to the torsion spring rotating the nut halves in opposite directions. The two nut halves 14 and 16 form a chamber 54 to retain the washer 50. The cylindrical shoulder 59 encircles the washer 50 to limit axial expansion of the washer 50.

The surrounding of the elastomeric washer 50 by the faces 24 and 44, the cylindrical shoulder 59 and the cylindrical portion 42 results in a controlled compression of the elastomeric washer 50. The washer 50 follows a defined compression curve. The washer is acting analogous to a hydraulic system wherein the force exerted against the washer by the face 24 of the first nut half 14 is applied uniformly to the cylindrical portion 42, the face 44 and the cylindrical shoulder 59 of the second nut half 16.

Wherein the torsion inducing means is shown as a conventional torsion spring 60 with tangs 62 and 64, any equivalent means could be employed to cause opposite rotation of the nut halves, as for example, a pre-stressed elastomeric sleeve or elastomeric binders secured to the nut halves on a bias.

Referring to FIG. 3, when the torsion spring 60 is in the assembled position as shown in FIG. 1, the left hand nut half 14 is induced to rotate in the direction of the downward pointing arrow on the nut half. The nut half 16 is induced to rotate in the direction of the upward pointing arrow on the nut half in FIG. 3. The nut halves rotate in opposite directions.

The nut half 14 rotates on the lead screw 10 with the threads 29 of the nut riding along the threads 11 of the lead screw 10 with engagement taking place at a—a and b—b. The nut half 16 is induced to rotate in the opposite direction by the torsion spring 60. The threads 31 of the second, right, hut half 16 ride along the threads 11 of the lead screw 10 with engagement taking place at c—c and d—d.

The nut halves move in the direction of the arrows e and f, in other words towards each other. This occurs because of the rotation and the threads 29 and 31 engage the thread 11 of the lead screw 10 which is away from each other. This continues while the face 24 of the first nut half 14 moves towards the face 44 of the second nut half 16.

The torsion spring 60 causes the nut halves 14 and 16 to rotate until they come to rest against the opposite surfaces of the high-friction elastomeric washer 50. The cylindrical shoulder 59 retains the elastomeric washer 50 between the faces 24 and 44 and limits the radial expansion of the washer 50.

The faces 24 and 44 resting against the washer 50 are called the locked position whereupon no further relative rotation of the nut halves 14, 16 takes place. They are jammed against the thread flanks at a—a, b—b, c—c and d—d. No further rotation takes place and, more importantly, no reverse rotation takes place because of the high frictional contact between the washer 50 and the faces 24, 44. Rotation of the lead screw 10 in the direction of the upward facing arrow L (i.e. clockwise when viewed from the right in FIG. 3) will cause the nut halves to move toward the right as a unit carrying whatever load is attached to the face plate 18 on the nut half 14.

Upon the end of the traverse of the lead screw 10 to the right, with the nut half 14 pushing the nut half 16 to the right as viewed in FIG. 3, the length of the lead screw, the direction of the lead screw is reversed. At that time, the thread flanks are still in engagement at c—c, d—d and there will be no lost movement because of backlash since these surfaces are already in intimate contact. The nut halves being biased in such a manner creates a wedging effect and locking of the two nut system.

If wedging did not occur, the nuts would act independently of each other and backlash, due to gaps between the thread flanks, would take place. The load applied to the left nut half 14 or mounting nut would merely cause the right nut half 16 to rotate with respect to the left.

However, the utilization of the high-friction elastomeric washer 50 in conjunction with the torsion spring's ability to rotate one nut half with respect to the other to maintain intimate contact between the two nut halves with the elastomeric friction washer and with the engaged thread flanks, the backlash is eliminated.

Consequently, any axial force applied to the left nut half 14 passes through the friction washer 50 before reaching the right nut half 16. The friction restricts the right nut half's ability to rotate relative to the left nut.

As wear occurs at the thread nut halves and screw flank's contact areas a—a, b—b, c—c, and d—d, as seen in FIG. 3, because the torsion spring 60 is acting on the nut halves constantly to urge them against the flanks of the screw thread, gaps do not appear at the contact areas. However, the force applied to the elastomeric washer 50 tends to lessen permitting the torsion spring 60 to continue to rotate the nut halves together rather than to allow a gap to occur at the washer 50 or at the coated surfaces 24, 44. Consequently, the system is not dependent upon the force of a compression spring, as in our earlier patent, U.S. Pat. No. 4,131,031. Wear is compensated for and a relatively low lock force is required to maintain the system's stiffness.

Figure 4:
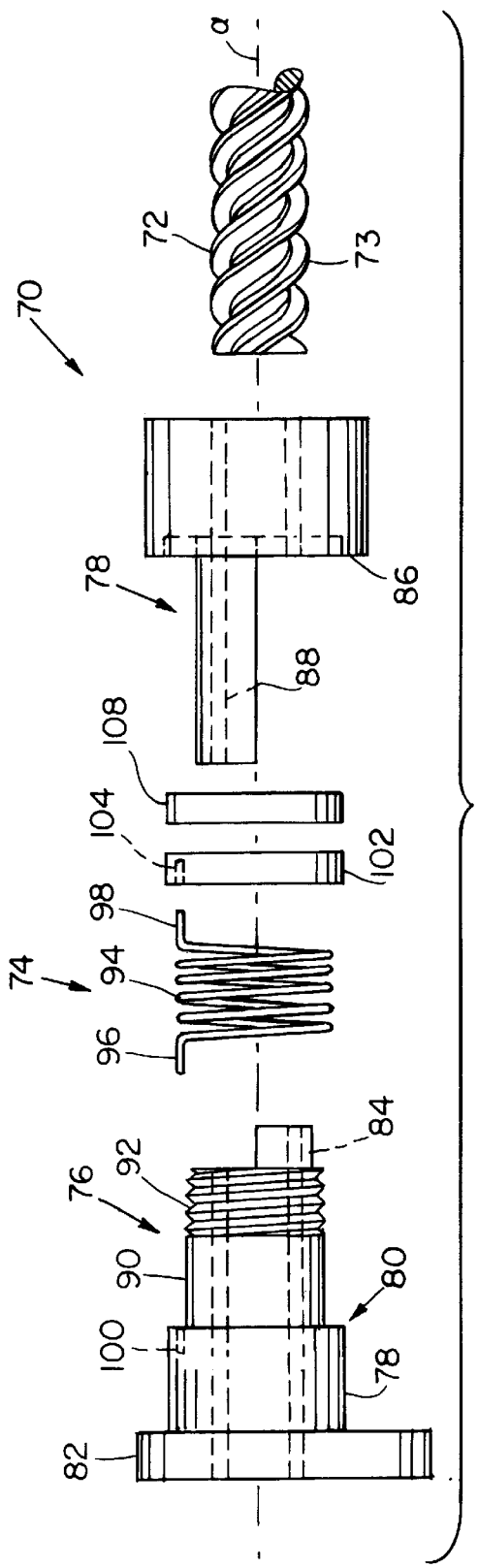
FIG. 4 is a side elevation view of the disassembled components of an alternative embodiment of an anti-backlash nut assembly according to this invention.
Figure 5:
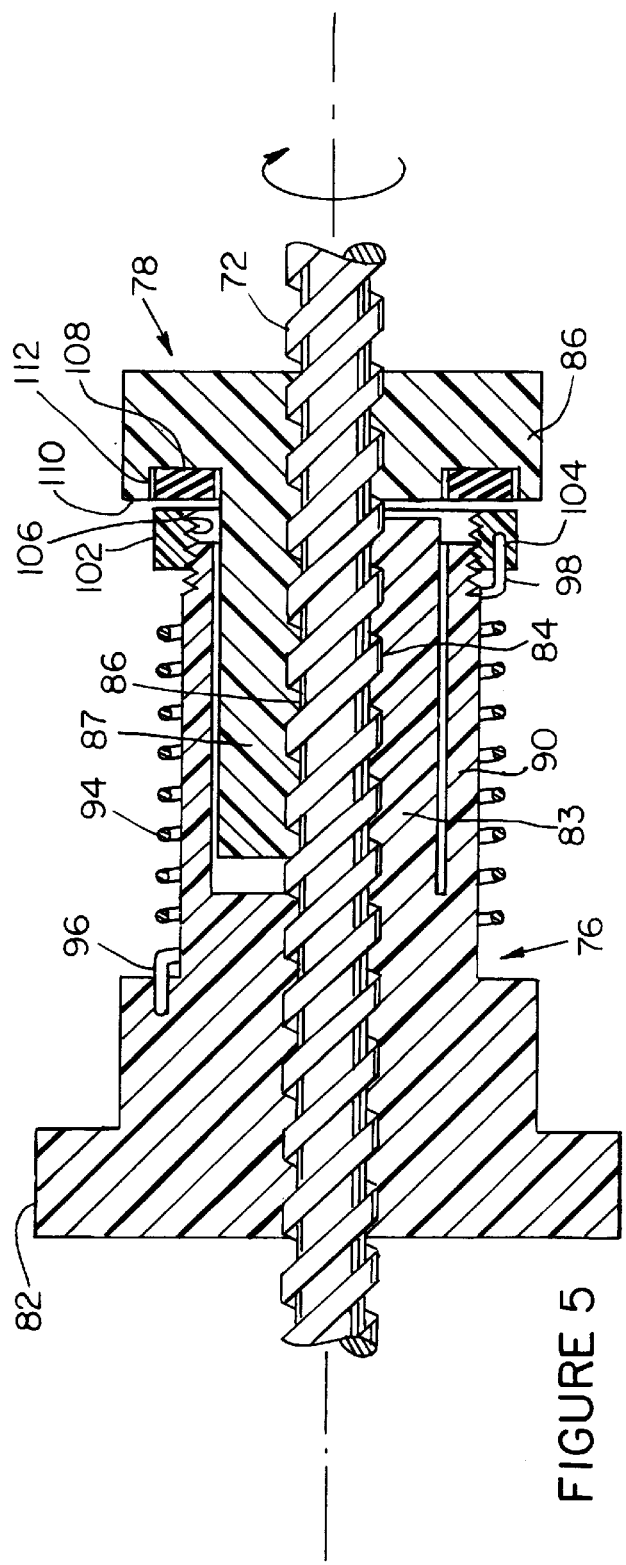
FIG. 5 is a sectional view of the anti-backlash nut assembly of FIG. 4.

An alternative anti-backlash nut assembly 70 illustrated having a lead screw 72 and a nut assembly 74 is shown in FIGS. 4 and 5. The nut assembly 74 comprises a first or left hand nut portion 76 and a second or right hand nut portion 78 which are driven in bidirectional translation, back and forth along the screw 72 by the rotation of the screw. The nut portions 76 and 78 are also called nut halves.

The first portion 76 has a tubular section 80 with an enlarged outside diameter and a threaded hole for the screw 72 and a faceplate 82 to which apparatus such as a printer carriage may be bolted. The faceplate 82 also has a through hole for the lead screw 72. The first nut half 76 has a hemi-cylindrical finger 83 which is approximately one half of a cylindrical nut and has internal threads 84 complementary to the external threads 73 of the lead screw 72.

The second nut half 78 of the nut assembly 74 has a tubular section 86 with an enlarged outside diameter and a threaded through hole which accepts the lead screw 72. The second nut half 78 also has a hemi-cylindrical finger 87 with internal threads 88 complementary to the external threads 73 on the lead screw 72.

The first nut half 76 and the second nut half 78 are retained in an aligned position about the lead screw 72 by a retainer 90. The retainer 90 has an internal cylindrical shape which is coaxially disposed about the hemi-cylindrical fingers 83 and 87 of the nut halves 76 and 78 to retain the opposing internal threads 84 and 88 of the nut halves 76 and 78 in alignment with the threads 73 on the lead screw 72. The retainer 90 in a preferred embodiment is formed integrally with the first nut portion 76 as discussed below.

An external thread 92 is provided as shown on the right hand portion of the retainer 90. Coaxially mounted on the retainer 90 is a torsion spring 94. The torsion spring 94 has a pair of tangs 96 and 98 which are engaged in bores 100 and 104. The bore 100 is provided at one end (the left side as seen in FIG. 5 in proximity to the face plate 82) of the retainer 90 and is more clearly shown in FIG. 5. The bore 104 is located on the left side surface of a spacer 102.

The spacer 102 is cylindrical and has internal threads 106 which meet with threads on the retainer 90 as seen in FIG. 5. A slightly elastomeric material such as a rubber washer 108 is between the spacer 102 and the second nut half 78. The elastomeric spacer 108 makes the system slightly less stiff yet still allows for slight shaft irregularities frequently encountered in rolled formed lead screws 72, thus maintaining torque consistency over shaft length.

The tubular section 86 of the second nut half 78 has an outer annular raised flat face 110 and an inner annular groove 112. The annular groove 112 receives the rubber washer 108. The groove 112 limits radial expansion of the washer 108 when compressed. The controlled compression of the washer ensures that the force to compress the washer does not jump. The encased material acts analogous to a hydraulic system.

Figure 6:
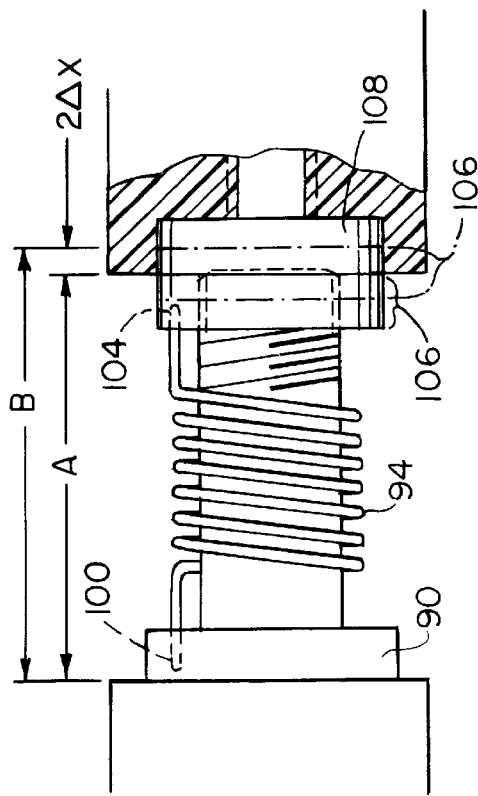
FIGS. 6 and 7 illustrate in schematic form the operation of the invention.
Figure 7:
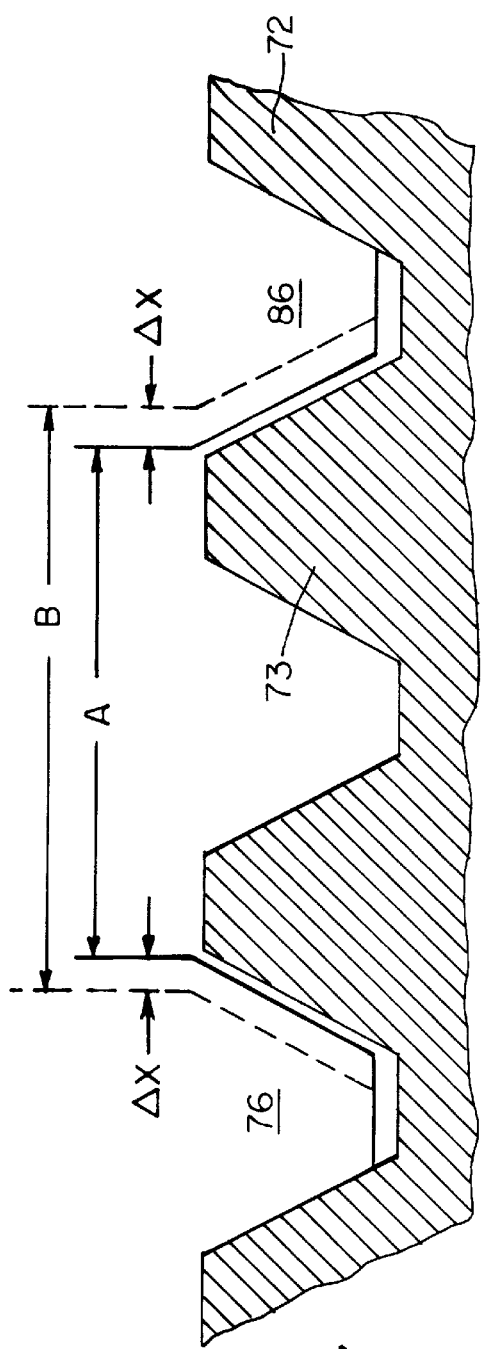

As can be seen from the schematic representations of FIGS. 6 and 7, the operation of the rotationally mounted spacer is as follows. The thread 73 on the lead screw 72 or nut assembly will wear through use, tending to create a space between opposing nut portions. Assume the wear is equal to $\Delta x$. Therefore the space between nut halves 76 and 78 would increase from A to B by a distance of $2\Delta x$. However, in accordance with this invention, as this occurs, the spacer 102 which is torsionally biased by the spring 94 is now free to rotate about the thread on the retainer 90 and thus take up the gap $2\Delta x$ left by nut wear. The elastomeric spacer, washer 108 is moved laterally by the spacer 102. The washer 108 and spacer 102 are shown in solid in the pre-rotated position and in phantom in the post-rotated position.

The internal thread on the spacer 102 is designed to have a sufficiently fine enough thread so as not to be contra-rotated once advanced. The assembly thereby creates an extremely stiff anti-backlash of U.S. Pat. No. 4,131,031. At the same time, the torsion spring force required to rotate the spacer 102 need only be enough to rotate the spacer longitudinally along the retainer 90 thereby imparting very little force between opposing nut halves, thus a very low torque system with extremely high system stiffness.

What is claimed is:

1. An anti-backlash nut designed to undergo bidirectional translation along a rotatable screw having an external thread, the nut having an internal thread complementary to the thread on the screw, the nut having:
   (a) two nut halves, each having the internal threads and being movable as a unit and relative to each other on the screw;
   (b) a torsion spring joining the two nut halves to induce their relative rotation on the screw in opposite directions toward a closed abutting position to take up backlash between the screw threads and the internal threads on the nut;
   (c) a washer provided between faces formed on each nut half normal to the screw to create high frictional contact between the washer and the faces to limit relative rotational movement between the nut halves when the nut halves are in the closed abutting position and to permit the nut halves to translate along the rotational screw, (d) characterized in that at least one nut half forms a chamber to receive the washer and limit radial expansion of the washer.

2. An anti-backlash nut according to claim 1 wherein one of the nut halves includes a faceplate for attaching the nut to a load.

3. An anti-backlash nut according to claim 1 wherein one of the nut halves telescopes rotatably within the other.

4. An anti-backlash nut according to claim 1 wherein in the chamber for the washer includes an annular groove in one of the nuts.

5. An anti-backlash nut according to claim 1, further comprising a retainer and wherein the nut halves each have a hemi-cylindrical finger, the fingers having internal threads adapted to the threads on the screws.

6. An anti-backlash nut according to claim 5, wherein the retainer is formed integrally with one of the nut halves.

7. An anti-backlash nut according to claim 1 wherein the chamber is a closed annular chamber formed by the nut halves.

8. An anti-backlash nut designed to undergo bidirectional translation along a rotational screw having external threads, the nut comprising:

(a) a pair of nut halves, each half having internal threads complementary to the screw, the nut halves being movable as a unit and relative to each other on the screw;

(b) a torsion spring joining the two halves to induce their relative rotation on the screw in opposite directions toward a closed, abutting position to take up backlash between the screw threads and the internal threads on the nut;

(c) a washer provided between faces formed on each nut half normal to the screw to make the coefficient of friction between the two nut halves higher than the coefficient of friction of the threads of the nut halves to the lead screw to limit relative rotational movement between the nut halves when they are in the closed abutting position and to permit the nut halves to translate along the rotational screw; and the nut halves forming a chamber to receive the washer and wherein at least one nut half limits radial expansion of the washer.

9. An anti-backlash nut according to claim 8 wherein one of the nut halves includes a faceplate for attaching the nut to a load.

10. An anti-backlash nut according to claim 8 wherein one of the nut halves telescopes rotatably within the other.

11. An anti-backlash nut according to claim 8 wherein the chamber for the washer is formed by an annular groove in one of the nut halves and the face of the other nut half.

12. An anti-backlash nut according to claim 8 further comprising a retainer, the retainer formed integrally with one of the nut halves, and wherein the nut halves each have a hemi-cylindrical finger, the fingers having internal threads adapted to the threads on the screw.

13. An anti-backlash nut designed to undergo bidirectional translation along a rotatable lead screw having an external thread, the anti-backlash nut comprising:

a first nut half having an internal thread complementary to the thread of the lead screw and an hemi-cylindrical finger having an internal thread complementary to the thread of the lead screw;

a second nut half having an internal thread complementary to the thread of the lead screw and an hemi-cylindrical finger having an internal thread complementary to the thread of the lead screw;

a cylindrical retainer disposed around the hemi-cylindrical fingers of the nut halves, the retainer formed integrally with the first nut half;

an internally threaded spacer complementary to the external thread of the retainer portion of the first nut half;

biasing means to advance the internally threaded spacer along the first nut portion;

a washer provided between the face on the second nut half and the spacer to make the coefficient of friction between the two nut halves higher than the coefficient of friction of the threads of the nut halves to the lead screw to limit relative rotational movement between the nut halves; and an annular groove formed on the second nut half to receive the washer and limit radial expansion of the washer in conjunction with the spacer.

14. An anti-backlash nut according to claim 13 wherein the biasing means is a torsion spring.

15. An anti-backlash nut designed to undergo bidirectional translation along a rotatable lead screw having an external thread, the anti-backlash nut comprising:

a first nut half having an internal thread complementary to the thread of the lead screw and an hemi-cylindrical finger having an internal thread complementary to the thread of the lead screw;

a second nut half having an internal thread complementary to the thread of the lead screw and an hemi-cylindrical finger having an internal thread complementary to the thread of the lead screw;

a cylindrical retainer disposed around the hemi-cylindrical fingers of the nut halves, the retainer formed integrally with the first nut half;

a torsion spring to advance the internally threaded spacer along the first nut portion;

a washer provided between the face on the second nut half and the spacer to make the coefficient of friction between the two nut halves higher than the coefficient of friction of the threads of the nut halves to the lead screw to limit relative rotational movement between the nut halves; and an annular groove formed on the second nut half to receive the washer and limit radial expansion of the washer in conjunction with the spacer.

* * * * *

UNITED STATES PATENT AND TRADEMARK OFFICE
CERTIFICATE OF CORRECTION

PATENT NO. : 6,131,478
DATED : October 17, 2000
INVENTOR(S) : Keith W. Erikson and Kenneth W. Erikson It is certified that error appears in the above-identified patent and that said Letters Patent is hereby corrected as shown below:

In claim 4, after "wherein" delete "in".

Signed and Sealed this

Fifteenth Day of May, 2001

*Attest:*

NICHOLAS P. GODICI

*Attesting Officer*   *Acting Director of the United States Patent and Trademark Office*